(No Model.) 3 Sheets—Sheet 3.

E. G. PASSMORE.
LAWN MOWER.

No. 455,974. Patented July 14, 1891.

Witnesses:
Hamilton D. Turner
Alex. Barkoff

Inventor:
Everett G. Passmore
by his Attorneys
Howsen & Howsen

UNITED STATES PATENT OFFICE.

EVERETT G. PASSMORE, OF HAVERFORD, PENNSYLVANIA.

LAWN-MOWER.

SPECIFICATION forming part of Letters Patent No. 455,974, dated July 14, 1891.

Application filed December 1, 1890. Serial No. 373,200. (No model.)

*To all whom it may concern:*

Be it known that I, EVERETT G. PASSMORE, a citizen of the United States, and a resident of Haverford, Montgomery county, Pennsylvania, have invented certain Improvements in Lawn-Mowers, of which the following is a specification.

My improvements relate to the driving-gear of the machine and to the supporting and adjusting devices for the fixed knife, the details of the invention and the particular features of novelty involved therein being fully described hereinafter, and specifically set forth in the claims.

Figure 1:
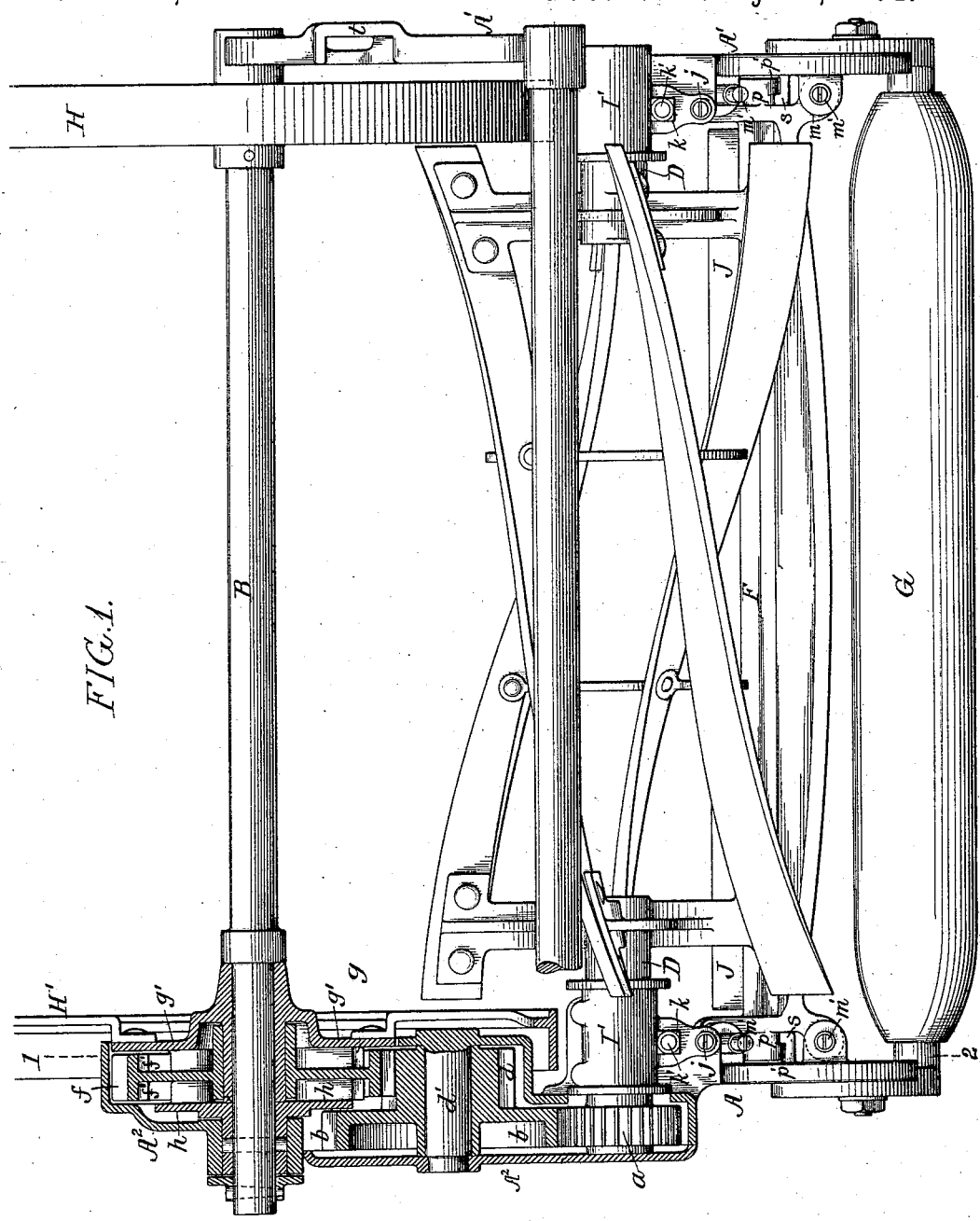
Figure 2:
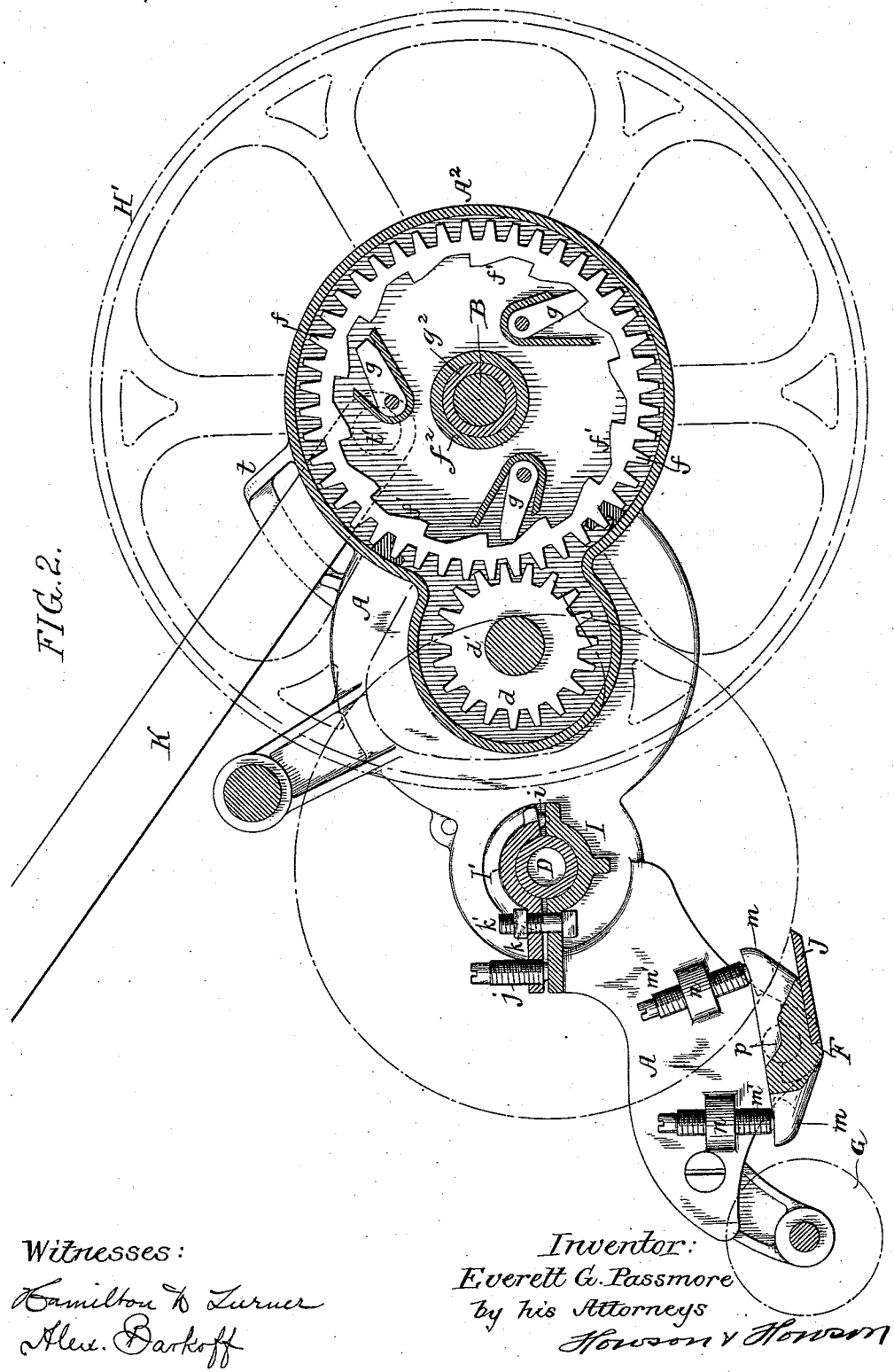
Figure 3:
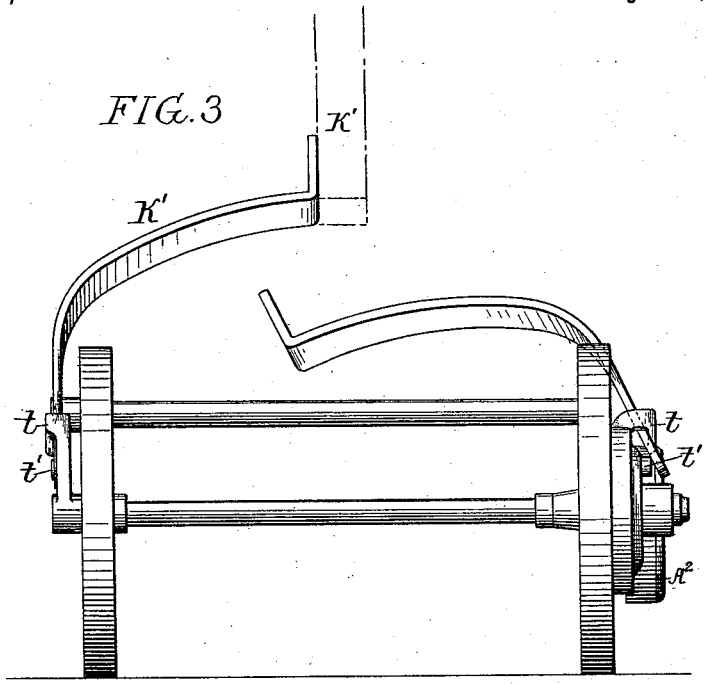
Figure 4:
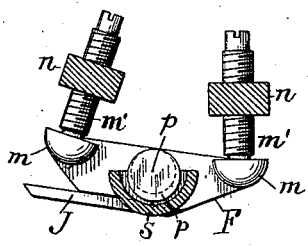
Figure 5:
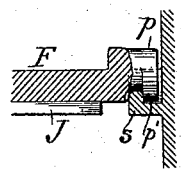

In the accompanying drawings, Figure 1 is a plan view, partly in section, of sufficient of a lawn-mower to illustrate my invention. Fig. 2 is a view partly in elevation and partly in section on the line 1 2, Fig. 1. Fig. 3 is a front view of part of the frame of the machine, illustrating one of the features of the invention; and Figs. 4 and 5 are respectively a transverse section and longitudinal section illustrating another feature of the invention.

A A' represent the opposite side frames of the machine, which are provided with bearings for the driving-shaft B, rotary knife or cutter-shaft D, fixed knife-bar F, and rear bearing-roller G, the side frame A, also having a hood or casing $A^2$ for inclosing, in part, the gearing whereby movement of the driving devices is transmitted to the rotary knife-shaft. The driving-shaft B carries the supporting traction-wheels H H', the wheel H being secured to the shaft, but the wheel H' being free to turn on said shaft. Both wheels, however, are driving-wheels, the wheel H' acting directly upon the gear-wheel, and the wheel H acting indirectly or through the medium of the shaft B, as described hereinafter.

The driving-gearing for the rotary knife-shaft comprises a spur-pinion $a$ on one end of said shaft, this spur-pinion meshing with a spur-wheel $b$, secured to or forming part of which is a spur-pinion $d$, such combined spur wheel and pinion turning upon a stud $d'$, and the pinion $d$ meshing with a spur-wheel $f$, to which the power is applied. This spur-wheel has a hub turning on the hub of the wheel H', and is provided with a central web, and on the internal periphery of the spur-wheel on each side of said web are ratchet-teeth $f'$, the teeth on the inner side of the wheel being engaged by pawls $g$ hung to a disk $g'$, which forms part of the traction-wheel H', and serves as part of the covering or casing for the gearing, the ratchet-teeth on the outer side of the wheel $f$ being engaged by pawls $g$ hung to a disk $h$, which is secured to the driving-shaft B, and has an outer hub serving as a support or bearing for part of the outer casing $A^2$, which incloses the gearing, so that lateral compactness is insured. (See Fig. 1.) Either of the traction-wheels is thus at liberty to move rearwardly without regard to the other, and the power of the wheel which is on the opposite side of the machine from the gearing is transmitted to said gearing in a simple manner by the shaft B, to which the wheel is rigidly attached.

The rotary knife-shaft or spindle D turns at each end in a half-bearing I, formed on one of the side frames of the machine, and is retained by the cap I', which has on one side of the shaft conical pins $i$, adapted to recesses in the lower half of the bearing, and on the opposite side of the shaft carries a set-screw $j$, which is in contact with said lower half of the bearing, the cap being also acted upon by a nut $k$ on a bolt $k'$, which passes through the lower bearing and cap and occupies a position between the shaft and the set-screw. The cap I' of the bearing can therefore be adjusted to compensate for wear of the shaft or bearing by tightening the nut $k$, and the pressure of the cap upon the shaft can be determined by a proper adjustment of the set-screw $j$, so that while the snug running of the shaft in its bearings can always be insured, binding of the shaft in its bearings, so as to interfere with the easy running of the machine, can readily be prevented, the cap when once adjusted being locked in position by reason of the jamming or locking effect of one of the fastening devices upon the other. The cap can also be readily removed, when such removal is required, by simply removing the nut from the bolt $k'$, this bolt and nut being the only means for holding the cap in position, a feature which is due to the fact that the bolt is located between the pivot-pin and the set-screw. The rotary knife or cutter can thus be readily removed from the machine without disturbing the side plates or other parts of the machine, the knife-shaft being withdrawn laterally from its driving-pinion and then lifted out.

The transverse knife-bar F, which carries the stationary cutting blade or knife J, is enlarged at each end, so as to form bearing-lugs $m$ for the action of adjusting-screws $m'$, adapted to lugs $n$ on the side frame of the machine, and each end of the stationary knife-bar has a projecting trunnion $p$, adapted to the inner flange of a pocket $s$, projecting inwardly from the side frame, so that by manipulating the set-screws $m'$ the knife-bar can be caused to swing on its trunnions to raise or lower the cutting-edge of the knife-bar J.

Each of the trunnions $p$ of the transverse knife-bar has a downwardly-projecting flange $p'$, (see Figs. 4 and 5,) and each of the pockets $s$ is recessed sufficiently for the reception of this flange, so that while the knife-bar can be readily removed from the machine when desired and readily adjusted it is, when in use, firmly locked in position both vertically and laterally, the trunnions being firmly seated on the inner flanges of the pockets $s$ and the flanges $p'$ of said trunnions bearing against said inner flanges, as shown in Fig. 5, so as to effectually retain the bar.

On each of the side frames of the machine is formed a loop $t$, projecting outward beyond the periphery of the gear-case, and some distance below and beyond the loop is a projecting pin $t'$, each loop and pin serving as a means of connecting to the side frame of the machine one of the handle-braces K, the brace being first passed through the loop in the position shown at the right-hand side of Fig. 3, until the opening at the lower end of the brace is in line with the pin $t'$, whereupon the upper end of the brace is moved outwardly, so as to swing the lower end of the brace onto the pin, as shown at the left-hand side of Fig. 3, the upper ends of the braces being held in this position by the interposed handle-bar K', as shown by dotted lines in Fig. 3.

No cutting away of the gear-case or other part of the machine is therefore necessary, and no nuts, bolts, or like fastenings are required in order to secure the handle-braces to the frame of the machine, and the fitting up of the machine is consequently facilitated to that extent.

Having thus described my invention, I claim and desire to secure by Letters Patent—

1. The combination, in driving-gear for lawn-mowers, of the primary spur-wheel having a double ratchet, the driving-shaft secured to one of the traction-wheels, a disk or plate secured to said shaft and carrying pawls engaging with one of said ratchets, and a second traction-wheel loose on the shaft and having pawls engaging with the other ratchet, substantially as specified.

2. The combination of the rotary knife-shaft, driving-gear therefor having as one of its elements a spur-wheel with double ratchet, a casing partly inclosing said gearing, a driving-shaft secured to one of the traction-wheels, a disk secured to said shaft and having pawls engaging with one of said ratchets, and a loose traction-wheel having a central disk, with pawls engaging with the other ratchet, said disk also forming part of the inclosing case for the gearing, substantially as specified.

3. The combination of the transverse knife-bar, having end bearing-lugs and projecting trunnions, with the side frame of the machine, having open-topped pockets projecting from the inner faces of said frames for receiving said trunnions, and set-screws for bearing upon the lugs of the bar, whereby on backing off the set-screws the knife-bar can be withdrawn, substantially as specified.

4. The combination of the side frames, having set-screws and inwardly-projecting recessed pockets open at the top, with the transverse knife-bar having lugs for the action of said set-screws, and projecting trunnions seated on the inner flanges of said pockets and having flanges entering the recesses of the same, whereby the bar is confined in position both vertically and laterally, but can be withdrawn on backing off the set-screws, substantially as specified.

5. The combination of the knife-shaft and its gearing, one of the elements of which is a double-ratcheted spur-wheel, the loose traction-wheel carrying pawls engaging with one of said ratchets, the shaft secured to the other wheel and having a disk carrying pawls engaging with the other ratchet, and a gear-case having a portion mounted upon the hub of said disk, substantially as specified.

In testimony whereof I have signed my name to this specification in the presence of two subscribing witnesses.

EVERETT G. PASSMORE.

Witnesses:
WM. D. CONNER,
HARRY SMITH.